(12) United States Patent
Bar-Yaakov et al.

(10) Patent No.: US 9,315,731 B2
(45) Date of Patent: Apr. 19, 2016

(54) HIGH IMPACT POLYSTYRENE FLAME RETARDED COMPOSITIONS

(75) Inventors: Yoav Bar-Yaakov, Tel-Aviv (IL); Yaniv Hirschsohn, Rehovot (IL); Ita Finberg, Beer Sheva (IL)

(73) Assignee: BROMINE COMPOUNDS LTD., Be'er Sheva (IL)

( * ) Notice: Subject to any disclaimer, the term of this patent is extended or adjusted under 35 U.S.C. 154(b) by 778 days.

(21) Appl. No.: 13/636,449

(22) PCT Filed: Mar. 21, 2011

(86) PCT No.: PCT/IL2011/000265
§ 371 (c)(1),
(2), (4) Date: Dec. 28, 2012

(87) PCT Pub. No.: WO2011/117865
PCT Pub. Date: Sep. 29, 2011

(65) Prior Publication Data
US 2013/0102703 A1  Apr. 25, 2013
US 2014/0039095 A9  Feb. 6, 2014

Related U.S. Application Data

(60) Provisional application No. 61/315,960, filed on Mar. 21, 2010.

(51) Int. Cl.
*C08L 63/00* (2006.01)
*C09K 21/14* (2006.01)
*C08J 3/22* (2006.01)
*C08L 51/04* (2006.01)

(52) U.S. Cl.
CPC ............... *C09K 21/14* (2013.01); *C08J 3/226* (2013.01); *C08L 51/04* (2013.01); *C08J 2325/06* (2013.01); *C08J 2463/00* (2013.01); *C08L 2201/02* (2013.01); *C08L 2205/02* (2013.01)

(58) Field of Classification Search
CPC ....................................... C08L 63/00
USPC ...................................... 523/456
See application file for complete search history.

(56) References Cited

U.S. PATENT DOCUMENTS

| 4,055,606 A * | 10/1977 | Prevorsek et al. ............ 525/438 |
| 4,605,708 A | 8/1986 | Bar-Yaakov et al. |
| 5,304,591 A * | 4/1994 | Nowakowsky et al. ........ 524/494 |
| 5,395,874 A | 3/1995 | Mishima et al. |
| 5,837,799 A * | 11/1998 | Chen et al. .................... 528/102 |
| 8,067,497 B2 * | 11/2011 | Bar-Yaakov et al. ......... 524/599 |
| 8,524,813 B2 * | 9/2013 | Bar-Yaakov et al. ......... 524/101 |
| 8,991,321 B2 * | 3/2015 | Bar-Yaakov et al. ...... 108/51.11 |
| 2003/0207969 A1 * | 11/2003 | Capocci et al. ............... 524/236 |
| 2006/0148948 A1 | 7/2006 | Bar-Yaakov et al. |
| 2008/0303006 A1 * | 12/2008 | Huijs et al. .................... 252/609 |
| 2009/0036631 A1 * | 2/2009 | Kaji et al. ........................ 528/95 |
| 2012/0309869 A1 | 12/2012 | Bar-Yaakov et al. |
| 2013/0102703 A1 * | 4/2013 | Bar-Yaakov et al. ......... 523/456 |
| 2014/0039095 A9 * | 2/2014 | Bar-Yaakov et al. ......... 523/456 |

FOREIGN PATENT DOCUMENTS

| EP | 0467364 A1 | 10/1996 |
| EP | 1587865 A1 | 10/2005 |
| JP | H 04136053 A | 5/1992 |
| JP | H 05202251 A | 8/1993 |
| JP | H 073107 A | 1/1995 |
| JP | 08109269 A | 4/1996 |
| KR | 680481 B1 | 2/2007 |
| WO | 2010010561 A1 | 1/2010 |
| WO | 2011077439 A1 | 6/2011 |

OTHER PUBLICATIONS

Finberg, "New flame retardant systems for styrenic plastics and method of preparation", Polymer Degradation and Stability, 64:3;465-470. (1999).

* cited by examiner

*Primary Examiner* — Megan McCulley
(74) *Attorney, Agent, or Firm* — Browdy and Neimark, PLLC

(57) ABSTRACT

The invention relates to a polymer composition comprising high impact polystyrene (HIPS) and a combination of flame retardants which are brominated epoxy oligomers and polymers. A process for preparing the HIPS composition through a masterbatch route and a masterbatch composition which contains the flame retardants are also disclosed.

16 Claims, No Drawings

HIGH IMPACT POLYSTYRENE FLAME RETARDED COMPOSITIONS

This invention relates to the group of oligomeric and polymeric flame retardants obtainable by reacting tetrabromobisphenol A with epichlorohydrin. The reaction of tetrabromobisphenol A with epichlorohydrin is known to yield various reactive brominated epoxy oligomers and polymers having high bromine content, which may be used as such, or in the form of their end-capped derivatives, as flame retardants in plastic materials. The aforementioned brominated epoxy oligomers and polymers, and their end-capped derivatives, are represented by formula (1):

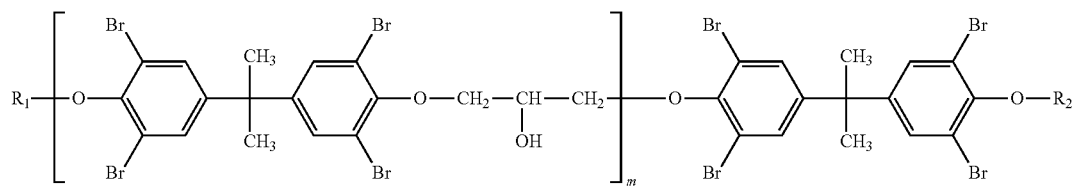

wherein m is the average degree of polymerization and $R_1$ and $R_2$ are independently selected from the group consisting of glycidyl ether and 2-hydroxypropyltribromophenol ether (the latter are hereinafter referred to as "the end-capped derivatives"):

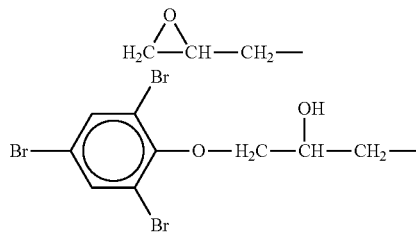

Brominated epoxy resins were mentioned in connection with polymeric compositions of high impact polystyrenes (HIPS) in JP 08109269, KR 680481 and WO 2010/010561. The former publication discloses a masterbatch composition comprising 50-90 parts by weight brominated epoxy resin and 10-50 parts by weight HIPS carrier.

For the purpose of the present invention, the flame retardants of formula (1) are classified into three subgroups:
1) Low molecular weight brominated epoxy oligomers and their end-capped derivatives, with number-average molecular weight between 670 and 2500 g/mol.
2) Intermediate molecular weight brominated epoxy polymers and their end-capped derivatives, with weight-average molecular weight between 5000 and 30000 g/mol.
3) High molecular weight brominated epoxy polymers and their end-capped derivatives, with weight-average molecular weight between 30000 and 80000 g/mol.

Low molecular weight brominated epoxy oligomers and their end-capped derivatives are useful in reducing the flammability of high impact polystyrenes (HIPS). During processing, these flame retardants become nicely dispersed in the HIPS polymeric matrix. Thus, low molecular weight brominated epoxy oligomers and their end-capped derivatives offer several advantages when used in HIPS applications. However, a significant drop in the impact strength and elongation at break of the resulting HIPS formulation is observed. For example, in order to secure HIPS formulation satisfying the stringent UL-94 V-0 flammability test (this test is explained in more detail hereinafter), a flame retarding system consisting of (i) the brominated flame retarding agent mentioned above and (ii) antimony trioxide in amounts of 15-20% and 4-5%, respectively, is added to the HIPS resin (the percentages are by weight, and are calculated with respect to the total weight of the HIPS formulation). Unfortunately, this amount of a flame retardant system in the HIPS causes a reduction of about 30-65% in the IZOD impact strength of the polymer, when compared to the neat, additive-free HIPS resin. UL-94 V-0 rated HIPS formulations which are flame retarded with intermediate molecular weight brominated epoxy polymers and their end-capped derivatives also exhibit a severe drop in their IZOD impact strength, of about 50-70% relative to the neat HIPS resin, suggesting that there may be an inverse relation between the polymerization degree of the flame retardants of formula (1) to be used in the HIPS formulation and the impact strength of the HIPS formulation.

For commercial polymers, mechanical properties, such as IZOD impact strength, are of fundamental interest, and it is therefore important to supply UL-94 rated HIPS formulations having an acceptable impact resistance. It has now been found that the impact resistance of HIPS formulations which are flame-retarded with either low or intermediate molecular weight brominated epoxy (or an end-capped derivative thereof), is surprisingly increased by the addition of a flame retardant belonging to the subgroup of high molecular weight brominated epoxy polymers (or their end-capped derivatives). The resulting HIPS compositions, which are flame retarded using the combination of either low or intermediate molecular weight brominated epoxy resins (or an end-capped derivative thereof), together with high molecular weight brominated epoxy resin, satisfy the UL-94 V-0 flammability test and also exhibit a satisfactory level of impact strength.

Hereinafter, the flame retardants belonging to the first, second and third subgroups identified above are abbreviated LMW-BE, IMW-BE and HMW-BE, respectively.

Accordingly, a first aspect of the invention relates to a flame-retarded HIPS formulation, comprising HIPS resin, at least one flame retardant selected from the group consisting of LMW-BE and IMW-BE, and at least one HMW-BE flame retardant. A second aspect of the invention relates to a method for increasing the impact resistance (IZOD impact strength) of articles made from flame-retarded HIPS formulation in which LMW-BE, IMW-BE or a mixture thereof is present, comprising adding HMW-BE to the HIPS formulation.

The invention is primarily directed to a flame-retarded polymeric composition comprising high impact polystyrene (HIPS) and a combination of flame retardants of Formula (1):

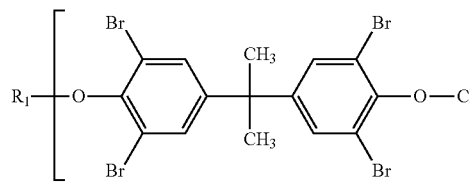 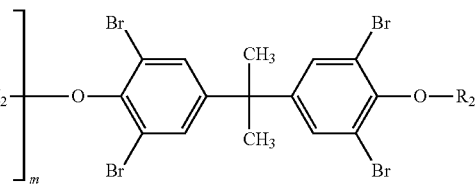

wherein m indicates the degree of polymerization and $R_1$ and $R_2$ are independently selected from the group consisting of:

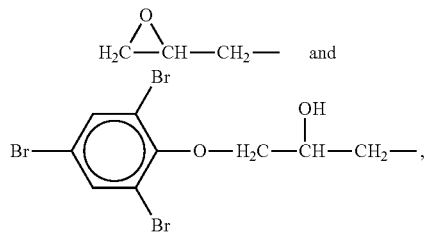

wherein said combination of flame retardants of Formula (1) comprises:
(i) at least one high molecular weight brominated epoxy polymer (HMW-BE) having weight-average molecular weight between 30,000 and 80,000, or an end-capped derivative thereof; and
(ii) at least one low molecular weight brominated epoxy oligomer (LMW-BE) with number-average molecular weight between 670 and 2500, or at least one intermediate molecular weight brominated epoxy polymer (IMW-BE) with weight-average molecular weight between 5000 and 30000; or an end-capped derivative thereof;
and wherein the HMW-BE is the predominant component in said combination of flame retardants.

HIPS, the rubber-modified copolymers or homopolymers of styrenic monomers, are obtainable, for example, by mixing an elastomer (butadiene) with the (optionally substituted) styrenic monomer(s) prior to polymerization. Characteristics and compositions of HIPS are described, for example, in "Encyclopedia of Polymer Science and Engineering", Volume 16, pages 88-96 (1985). The HIPS formulations provided by the invention generally comprise not less than 50 wt % HIPS resin, e.g., between 50 and 95 wt %, and preferably between 70 and 90 wt % HIPS resins (such as HIPS resins having a melt flow index (MFI) between 1 and 50 g/10 min (ISO 1133; 200° C./5 kg)). HIPS resins which are suitable for use according to the invention are commercially available from various manufacturers, for example Dow Styron® or INEOSNOVA Empera.

In general, the total amount of the flame retardants (the combination of LMW-BE (and/or IMW-BE) and HMW-BE) present in the HIPS formulation is between 7 and 30 wt %. When UL-94 V-0 rated HIPS formulations are contemplated, then the amounts of the flame retardants are suitably adjusted in order to secure a bromine concentration of not less than 3.5 wt %, e.g., between 9 and 12 wt % (it should be noted that the bromine constitutes about 50-60% by weight of the flame retardant of Formula (1)). An inorganic flame retardant synergist, such as antimony trioxide, is also included in the HIPS formulation, whereby the action of the flame retardant system is enhanced. Thus, for attaining UL-94 V-0 rating, the total concentration of the combination of flame retardants of Formula (1) in the HIPS formulation is between 15 and 30% wt % with a synergist, for instance antimony trioxide, being also present in the formulation at a concentration of 0.5-5 wt %, preferably between 2 to 4 wt %. HIPS composition with bromine content between 9 and 11% by weight, and an inorganic synergist such as antimony trioxide of less than 3.5% by weight, e.g., from 2 to 3%, are especially preferred. If moderate UL-94 ratings are acceptable, namely, UL-94 V-1 or V-2 ratings, then lesser amounts of flame retardants and the inorganic synergist need to be applied.

UL-94 V-0 rated HIPS formulations of the invention were tested for IZOD impact strength. In the following description, when the notation "X:Y" is used, with the sum of X and Y being equal to 100, it is meant to indicate a mixture consisting of HMW-BE and LMW-BE/IMW-BE (by the notation "LMW-BE/IMW-BE" is meant either LMW-BE, IMW-BE, or both). The notation "X:Y" indicates how the mixture of flame retardants is proportioned by weight between the HMW-BE component and the LMW-BE/IMW-BE component(s).

Having tested the activity of different mixtures of HMW-BE and LMW-BE in weight proportions of 20:80, 35:65, 50:50 and 65:35, it was found that HIPS formulations, into which the 20:80 or the 65:35 mixtures were added, exhibit enhanced IZOD impact strength when compared with HIPS formulations which contain either the 35:65 or the 50:50 mixtures (the lowest impact strength was observed for the 35:65 mixture). In other words, two maxima are observed when the IZOD impact strength of the HIPS formulation is described as a function of the weight ratio between the HMW-BE and the LMW-BE components in the range noted above, with the minimum being located around the 35:65 combination. Our experimental results reported in the Examples below indicate that the preferred weight ratio between the two flame retardants is either smaller than 1:2 (e.g., between 1:5 and 1:2, more specifically between 1:4 and 1:2, with the predominant component being LMW-BE) or greater than 1:1, more specifically not less than 3:2 (e.g., between 3:2 and 5:1, for example between 3:2 and 4:1, where the predominant component is the HMW-BE).

The HIPS formulations of the invention were also tested for tensile properties (elongation at break) and for their heat distortion temperature (abbreviated HDT; this is temperature at which a polymer sample deforms under a specific load). From the elongation at break and HDT perspective, the HMW-BE and the LMW-BE should preferably be applied in a weight ratio greater than 1:1, e.g., not less than 3:2, such that the HMW-BE is the predominate flame retarding agent present in the formulation.

The flame retardants of Formula (1), which are suitable for reducing the flammability of HIPS according to the invention, will now be described in more detail.

LMW-BE flame retarding agents falling within the scope of formula (1) above include the epoxy-terminated resins represented by the following Formula (1a):

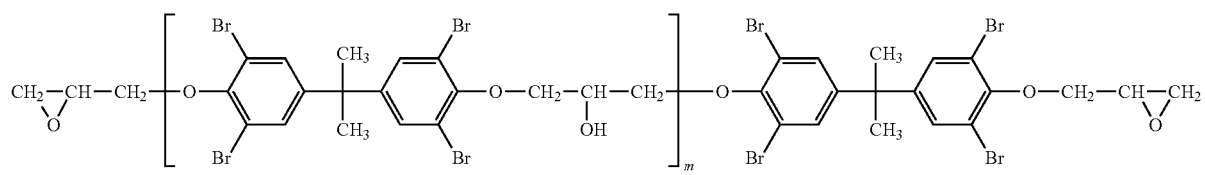

wherein m, the number average degree of polymerization, is in the range between 0.1 and 3.15. More specifically, the epoxy-terminated flame retarding agent represented by Formula (1a) has an average epoxy equivalent weight in the range between 340 and 1250. The epoxy equivalent weight (EEW) is defined as the molecular weight of the substance divided by the number of epoxy groups contained therein, and may be measured by methods known in the art (e.g., "Encyclopedia of polymer science and engineering" John Wiley & Sons, Vol. 6 (1986)).

The LMW-BE flame retarding agent of Formula (1a) is in the form of a mixture comprising the following individual brominated epoxy-terminated compounds:
(1a-I) the monomer of tetrabromobisphenol A diglycidyl ether, as shown by Formula (1a-I):

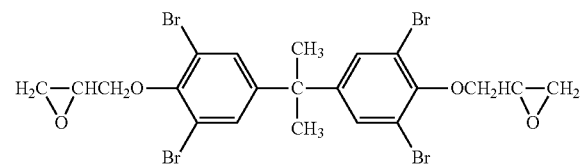

The epoxy equivalent weight of the monomer is 328 g/eq.
(1a-II) the dimer of tetrabromobisphenol A diglycidyl ether, as shown by Formula (1a-II):

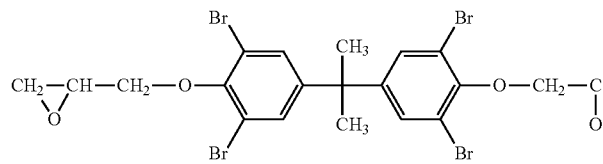

The epoxy equivalent weight of the dimer is 628 g/eq.
(1a-III) the trimer of tetrabromobisphenol A diglycidyl ether. The epoxy equivalent weight of the trimer is 928 g/eq. Higher oligomers can also be present in the mixture.

The flame retarding agent represented by Formula (1a) can be prepared by methods known in the art (for example, EP 467364) and is also commercially available. The flame-retardant of Formula (1a) may be produced by reacting tetrabromobisphenol A with epichlorohydrin, optionally in an inert solvent such as toluene or methyl isobutyl ketone, in the presence of a base (e.g., an aqueous solution of sodium hydroxide) under heating. Following phase separation, the organic phase, which contains the product, is washed with water to remove residual salts therefrom and the product is finally recovered by removing the organic solvent. The average epoxy equivalent weight of the product, namely, the distribution of the various epoxy resins of Formulas (1a-I), (1a-II) and (1a-III) within the product mixture, may be controlled by modifying the ratio of the reactants. The lower the concentration of epichlorohydrin used, the higher the epoxy equivalent weight of the resulting mixture.

Specific examples of flame retarding agents of formula (1a), which belong to the group of LMW-BE and which are suitable for use according to the invention, are described in Table 1 below. The flame retarding agents, which are mixtures composed of the monomer of Formula (1a-I), the dimer of Formula (1a-II), the trimer (1a-III) and possibly higher order oligomers of the diglycidyl ether of tetrabromobisphenol A, are commercially available (for example, F-2001 and F-2016, manufactured by ICL-IP). In Table 1, the flame retarding agent F-2001 is defined using the characteristic distribution of the individual epoxy-terminated compounds, as may be determined by gel permeation chromatography (GPC), along with the corresponding epoxy equivalent:

TABLE 1

| Flame retardant | monomer (1a-I) | Dimer (1a-II) | Trimer (Ia-III) | High order oligomers | Average epoxy equivalent |
|---|---|---|---|---|---|
| F-2001 | 40-70% | 15-35% | 5-25% | <12% | 450-650 |

Thus, a particularly preferred LMW-BE flame retarding agent of formula (1a) has number-average molecular weight from 800 to 1400, preferably from 800 to 1300 (e.g., with the distribution of chains set forth in Table 1).

LMW-BE flame retarding agents falling within the scope of formula (1) above include also the tribromophenol end-capped resins represented by Formula (1b):

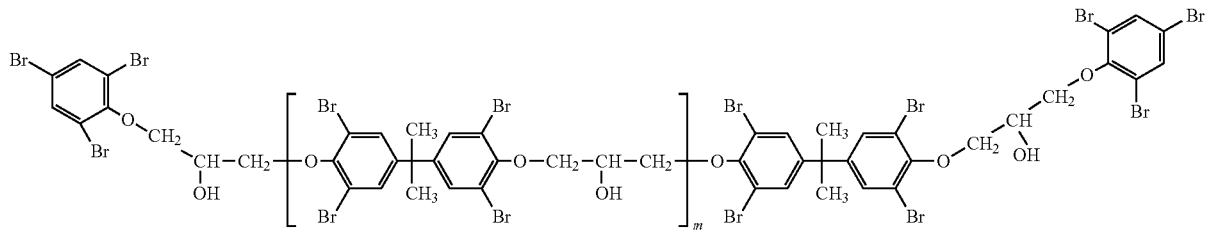

wherein n is an integer in the range between 0 and 5, and more preferably in the range between 0 and 4.

More specifically, the LMW-BE flame retarding agent of Formula (1b) is bis(2,4,6-tribromophenyl ether)-terminated tetrabromobisphenol A-epichlorohydrin resin, which is in the form of a mixture comprising the individual tribromophenol end-capped compounds of Formula (1b) wherein n equals 0, 1 and 2. Hereinafter, these individual compounds are respectively identified as the monomer of Formula (1b), abbreviated (1b-I); the dimer of Formula (1b), abbreviated (1b-II); and the trimer of Formula (1b), abbreviated as (1b-III).

The aforementioned tribromophenol-terminated end-capped resins of formula (1b) can be prepared by methods known in the art (for example, EP 467364) and are also commercially available. In general, the preparation involves reacting the mixture of epoxy resins identified by Formula (1a) with tribromophenol, possibly in a solvent. The reaction is carried out under heating in the presence of a catalyst (e.g., Li based catalyst) or an inorganic base, such as sodium hydroxide or potassium hydroxide, or an organic base, such as tertiary amine, quaternary ammonium salt or a quaternary phosphonium salt. A preparative procedure is illustrated below.

Specific examples of flame retarding agents of formula (1b), which belong to the group of LMW-BE and which are suitable for use according to the invention, are described in Table 2 below. The flame retarding agents, which are mixtures composed of the monomer of Formula (1b-I), the dimer of Formula (1b-II), the trimer (1b-III) and possibly higher order oligomers of bis(2,4,6-tribromophenyl ether)-terminated tetrabromobisphenol A-epichlorohydrin resin, are commercially available (F-3014, F-3516 and F-3020, manufactured by ICL-IP). In Table 2, these flame retarding agents are defined by the characteristic distribution of the individual tribromophenol-terminated compounds, as may be determined by gel permeation chromatography (GPC), and also by their number-average molecular weight:

TABLE 2

| Flame retardant Of formula (1b) | monomer (1b-I) | Dimer (1b-II) | Trimer (1b-III) and high order oligomers | Average molecular weight |
|---|---|---|---|---|
| F-3014 | 55-70%, preferably 65-70% | 20-35%, preferably 25-30% | Total: 5-15%, preferably 5-10% | ~1400 |
| F-3020 | 30-50%, preferably 35-45% | 5-15%, preferably 7-13% | Trimer: 5-20%, preferably 10-15%; Other oligomers: 20-40%, preferably 25-35% | ~2000 |

The tribromophenol end-capped LMW-BE resins which are suitable for use in the invention can also be represented by Formula (1b):

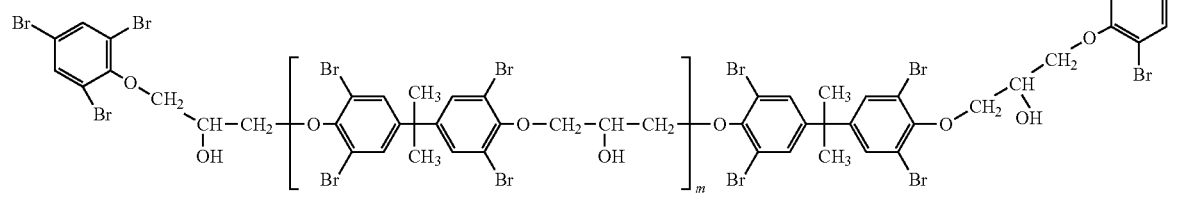

wherein m, the number-average degree of polymerization, is between 0.1 and 3. Particularly preferred LMW-BE flame retarding agents of formula (1b) have number-average molecular weight from 1300 to 2500, more preferably from about 1400 to 2500 (e.g., with the distribution of chains set forth in Table 2).

IMW-BE flame retarding agents falling within the scope of formula (1) above include the epoxy-terminated resins represented by the following Formula (1a):

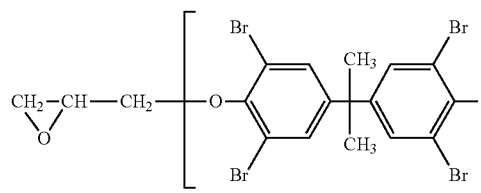

wherein m, the degree of polymerization, is in the range between 6 and 49. More specifically, the epoxy-terminated flame retarding agent represented by Formula (1a) has an average epoxy equivalent weight in the range between 2000 and 15000.

IMW-BE flame retarding agents falling within the scope of formula (1) above include also mixtures comprising the tribromophenol end-capped resins represented by Formula (1b):

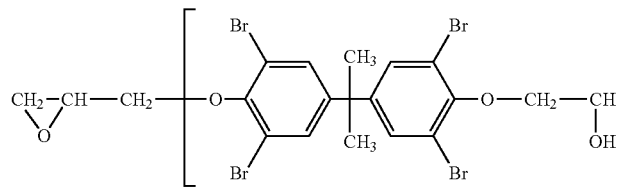

wherein n is an integer in the range between 3 and 48, and more preferably in the range between 3 and 35.

Commercially available examples of IMW-BE include F-3100 and F-2100 from ICL-IP, having molecular weight of about 10,000 g/mol and 20,000 g/mol, respectively. Suitable IMW-BE are also described in EP 1587865, and are being identified therein as IMW-BE having low content of volatile organic solvents.

HMW-BE flame retarding agents falling within the scope of formula (1) above include the epoxy-terminated resins represented by the following Formula (1a):

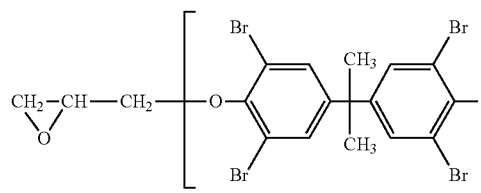

wherein m, the average degree of polymerization, is in the range between 49 and 135.

Preferred HMW-BE flame retarding agents have weight-average molecular weight between 30,000 and 70,000 and more preferably between 40,000 and 60,000. Commercially available examples of HMW-BE include F-2400 from ICL-IP, having molecular weight of about 50,000 g/mol.

The IMW-BE or the HMW-BE resins are prepared according to methods known in the art, which are similar to those described above for the LMW-BE (e.g., see U.S. Pat. No. 4,605,708, EP 467364 and EP 1587865).

It should be noted that the flame retarding agents to be used according to the present invention may comprise both symmetrical and unsymmetrical derivatives ($R_1$ and $R_2$ in Formula (1) are the same or different, respectively).

The HIPS formulation of the invention may comprise, in addition to the combination of the flame retarding agents of Formula I as set out above, also a small quantity of an inorganic synergist such as antimony trioxide, anti-dripping agent such as polytetrafluoroethylene (PTFE), and optionally conventional ingredients, such as fillers, impact modifiers, pigments, UV stabilizers, heat stabilizers, lubricants and antioxidants. The concentration of each of the conventional additives is typically in the range between 0 and 15% by weight, and more preferably between 0 and 7% by weight, of the total weight of the HIPS formulation. For example, the PTFE content of the HIPS composition is from 0.03-1%.

It has been also found that the HIPS compositions of the invention, in particular HIPS compositions which contain a combination of flame retardants consisting of high molecular weight brominated epoxy polymer of Formula (1a) with weight-average molecular weight from 40,000 to 60,000 and low molecular weight brominated epoxy oligomer of Formula (1a) with number-average molecular weight from 800 to 1300, with the weight ratio HMW-BE:LMW-BE being between 3:2 and 5:1, exhibit good resistance to color change induced by ultraviolet light. The experimental results reported below indicate that following exposure to UV light, the compositions of the invention demonstrate a color change significantly smaller in comparison to the color change of similar HIPS compositions which contain a different flame retardant (the comparative flame retardant was decabromodiphenyl ethane, which is highly recommended for HIPS applications). The color change was quantified using the delta E parameter and was measured according to Standard ASTM D-224479 (exposure to QUV 340B lamp for 150 hours using UV 2000 instrument from Atlas).

The HIPS compositions of the invention may be prepared as follows. The various ingredients of the composition are blended together according to their respective amounts. Generally, the ingredients may be first dry blended using suitable mixing machines, or may be fed directly to the extruder. The powder mixture may then be processed and compounded to form homogeneous pellets, for example, by using a twin-screw extruder. The pellets obtained are dried, and are suitable for feed to an article shaping process such as injection or extrusion molding. Process parameters are described in more detail in the examples that follow.

The mixture of the flame retarding agents of Formula (1) can also be added to the polymeric HIPS formulation via a concentrate or a masterbatch (which may optionally contain synergists such as antimony trioxide and/or anti-dripping agent such as polytetrafluoroethylene). A masterbatch is a composition comprising a suitable carrier, and a relatively high proportion of the flame retardant(s). Typically, the carrier is a polymer which is intended to facilitate the mixing of the masterbatch and improve the compatibility of the masterbatch and the blend polymer (the blend polymer is the polymer combined with the masterbatch; in the present case, the blend polymer is HIPS). Another advantage of using a masterbatch is that it is made of dust-free pellets, offering an ecological advantage over powdered material. Suitable carrier polymers applied in the masterbatch are therefore similar or identical with the blend polymer. However, it has been found that it is possible to prepare a masterbatch consisting essentially of the LMW-BE and HMW-BE flame retarding agents. The concentrations of the HMW-BE and the LMW-BE in the master batch are in the ranges between 10-90% and 90-10%, respectively.

More specifically, the invention provides a masterbatch composition which consists essentially of a combination of brominated flame retardants, said combination comprising:
(i) high molecular weight brominated epoxy polymer (HMW-BE) of Formula (1a):

having number-average molecular weight of about 800 to 1300, wherein the total concentration of said HMW-BE and LMW-BE in the masterbatch is not less than 91% (w/w, relative to the weight of the masterbatch), and is preferably not less than 93%, e.g., between 93% and 96%. The weight ratio between the HMW-BE and LMW-BE components of the masterbatch is preferably 3:2 to 5:1. For example, the masterbatch contains from 75 to 80% w/w HMW-BE with molecular weight of 40,000-60,000 (e.g., about 50,000) and from 15 to 25% w/w LMW-BE with number-average molecular weight of between 800 and 1300.

It should be noted that the masterbatch composition of the invention may further comprise additives such as anti-dripping agents such as polytetrafluoroethylene at a concentration between 0.1 and 5%, e.g., from 0.1 to 1% (w/w), and processing modifiers at a concentration between 1 and 9% (w/w), for example, ethylene methyl acrylate (EMA) copolymer or ethylene vinyl acetate (EVA). The preferred concentration of the processing modifier is from 1 to 5%. Other examples of processing modifiers include methyl methacrylate butadiene styrene copolymers and metallocene ethylene octane copolymers. An inorganic synergist such as antimony trioxide can also be added to the masterbatch, at a concentration between 0 and 9%. The concentrations of the additives set forth above are based on the total weight of the masterbatch.

The masterbatch is prepared by premixing the two flame-retarding agents, and compounding the resulting blend using extruders or other compounding equipment. If one of the flame retarding agents is provided in the form of pellets, and the other in the form of a powder, then the two components are fed separately to the extruder. The temperature profile in the extruder may be between 180 and 260° C. The extrudate is finally pelletized, affording the masterbatch in the form of pellets with average particle size of 0.5-4 mm, which are dust-free (as may be visually confirmed by shaking the same in a suitable vessel). The masterbatch can be compounded with the HIPS resin, and other additives, in an extruder to give the HIPS formulations.

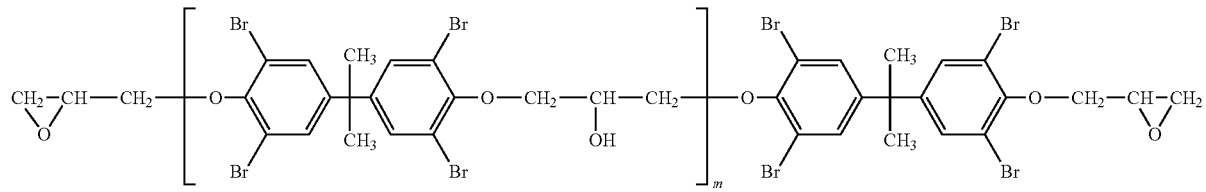

with weight-average molecular weight of about 30,000 to 70,000, preferably from 40,000 to 60,000; and
(ii) low molecular weight brominated epoxy oligomer (LMW-BE) of Formula (1a):

The use of the spherical masterbatch granules of the invention, in which the HMW-BE has a twofold function (active flame retardant and a carrier for the LMW-BE) facilitates the compounding process of the HIPS polymeric composition in

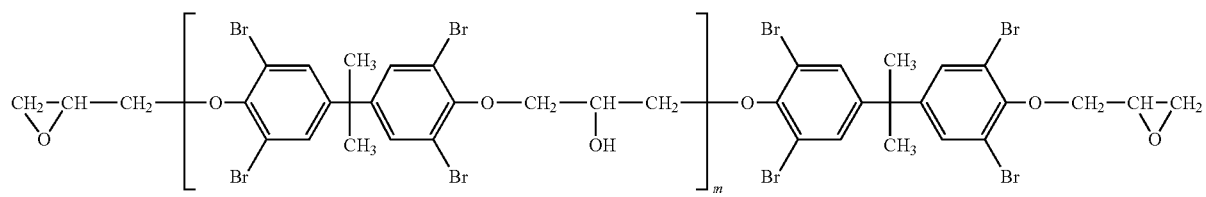

the extruder and allows a convenient route for incorporating the flame retardants into the HIPS polymeric composition. The invention also provides a process for preparing the high impact, polystyrene composition, comprising:
providing a masterbatch which consists essentially of brominated flame-retardants, said masterbatch comprising (i) at least one high molecular weight brominated epoxy (HMW-BE) polymer of Formula (1a) with weight-average molecular weight of about 30,000 to 80,000, preferably from 40,000 to 60,000 and (ii) at least one low molecular weight brominated epoxy (LMW-BE) oligomer of Formula 1a with number-average molecular weight between 670 and 2500, preferably from about 800 to 1300, wherein the total concentration of said HMW-BE and LMW-BE is not less than 91% based on the weight of the masterbatch composition, and compounding said masterbatch with high impact polystyrene in an extruder. The preferred masterbatch compositions for use in the process of the invention are as set forth above.

EXAMPLES

Materials

In the following examples, a flame retardant is sometimes abbreviated FR. The various materials used for preparing the compositions illustrated in the examples are described in Table 3:

TABLE 3

| Component (manufacturer) | GENERAL DESCRIPTION | FUNCTION |
|---|---|---|
| HIPS Styron 1200 A-tech (Dow) | High impact polystyrene | plastic matrix |
| F-2001 (ICL-IP) | Brominated epoxy oligomer average molecular weight 1000 g/mol | Polymeric FR |
| F-2016 (ICL-IP) | Brominated epoxy oligomer average molecular weight 1600 g/mol | Polymeric FR |
| F-3014 (ICL-IP) | End-capped brominated epoxy oligomer average molecular weight 1400 g/mol | Polymeric FR |
| F-3020 (ICL-IP) | End-capped brominated epoxy oligomer average molecular weight 2000 g/mol | Polymeric FR |
| F-3100 (ICL-IP) | End-capped brominated epoxy polymer average molecular weight 10000 g/mol | Polymeric FR |
| F-2100 (ICL-IP) | Brominated epoxy polymer average molecular weight 20000 g/mol | Polymeric FR |
| F-2400 (ICL-IP) | Brominated epoxy polymer average molecular weight 50000 g/mol | Polymeric FR |
| A0112 (Kafrit) | Antimony trioxide masterbatch which contains 80 wt % $Sb_2O_3$ | FR - synergist |
| Irganox B 225 (Ciba) | Antioxidant/processing stabilizer blend Ratio Irganox 1010:Irgafos 168 = 1:1 | Antioxidant & heat stabilizer. |
| PTFE Hostaflon 2071 (Dyneon) | PTFE fine powder (500 μ) | Anti-dripping agent |
| Tinuvin 326 (Ciba) | Stabilizer of the benzotriazole type | UV stabilizer |
| EMA LOTRYL ® 20MA08 (Arkema) | Ethylene Methyl Acrylate Copolymer | Process aid; viscosity enhancer |
| Titan 2220 (Florma) | Titanium dioxide | UV absorber |
| S-8010 (Albemarle) | Decabromodiphenyl ethane | Flame retardant |

Preparation of the Compositions

The ingredients were compounded, according to the weight ratios indicated in the tables given in the following examples, in a twin-screw co-rotating extruder ZE25 with L/D=32, with the temperature settings being between 20° C. and 250° C. The screw speed was 360 rpm, and the throughput (feeding rate) 18 kg per hour. More specific conditions are presented in Table 4:

TABLE 4

| PARAMETER | UNITS | Set values | Read values average |
|---|---|---|---|
| Screws | | Medium shear A | Medium shear A |
| Feeding zone temperature ($T_1$) | ° C. | no heating | no heating |
| $T_2$ | ° C. | 20 | 60 |
| $T_3$ | ° C. | 20 | 105 |
| $T_4$ | ° C. | 180 | 205 |
| $T_5$ | ° C. | 180 | 225 |
| $T_6$ | ° C. | 230 | 235 |
| $T_7$ | ° C. | 240 | 245 |
| $T_8$ | ° C. | 240 | 250 |
| $T_9$ | ° C. | 250 | 240 |
| Temperature of melt | ° C. | | 240 |
| Screw speed | RPM | 350 | 360 |
| Feeding rate | Kg/h | 17 | 18 |

The strands produced were pelletized in a pelletizer 750/3 from Accrapak, and then dried in a circulating air oven at 75° C. for 4 hours. The dried pellets were injection molded into test specimens using Allrounder 500-150 from Arburg. The conditions of the injection molding are tabulated in Table 5 below:

TABLE 5

| PARAMETER | UNITS | Set values |
|---|---|---|
| $T_1$ (Feeding zone) | ° C. | 200 |
| $T_2$ | ° C. | 225 |
| $T_3$ | ° C. | 225 |
| $T_4$ | ° C. | 230 |
| $T_5$ (nozzle) | ° C. | 230 |
| Mold temperature | ° C. | 30 |
| Injection pressure | bar | 550 |
| Holding pressure | bar | 450 |
| Back pressure | bar | 450 |
| Holding time | sec | 10 |
| Cooling time | sec | 16 |
| Mold closing force | kN | 500 |
| Filling volume (portion) | ccm | 45 |
| Injection speed | ccm/sec | 20 |
| Mold | | N° S 18572 |

The specimens were conditioned for one week at 23° C., and were then subjected to the tests outlined below.
Flammability Test The flammability test was carried out according to the Underwriters-Laboratories standard UL 94, applying the vertical burn on specimens of 1.6 mm thickness. Briefly, in the UL 94 vertical burn test, a set of five specimens is tested. A specimen is exposed vertically to a flame for 10 seconds. The specimen is ignited at the bottom and burns up. If the specimen self-extinguishes within 30 seconds, then the flame is reapplied for another ten seconds and then removed. Flaming droplets are allowed to fall on cotton located below the specimen. If the maximum burning time is less than 10 seconds (per application of flame), the total burning time in 10 flame applications is less than 50 seconds, and the droplets do not ignite the cotton, the material is classified as UL 94 V-0.
Mechanical Properties Impact strength was measured using the Izod notched test according to ASTM D-256-81, using pendulum impact tester type 5102 (Zwick); elongation at break was measured in Zwick 1435 material testing machine according to ASTM D-638-95; and HDT was measured according to ASTM D-648-07 with load of 1820 MPa and heating rate 2° C./min.

Examples 1-4

HIPS formulations, in which F-2016 and F-2400 were combined together in various weight ratios, were prepared according to the general procedure set out above. The compositions of the HIPS formulations and their properties are tabulated in Table 6.

TABLE 6

| Example | 1 | 2 | 3 | 4 |
|---|---|---|---|---|
| F-2400:F-2016 weight ratio | 20:80 | 35:65 | 50:50 | 65:35 |
| Composition (by weight %): | | | | |
| HIPS Styron 1200 | 74.6 | 74.8 | 75 | 75.1 |
| F-2016 | 15.8 | 12.7 | 9.7 | 6.8 |
| F-2400 | 4 | 6.9 | 9.7 | 12.6 |
| AO 112 | 5 | 5 | 5 | 5 |
| PTFE | 0.1 | 0.1 | 0.1 | 0.1 |
| Irganox B-225 | 0.2 | 0.2 | 0.2 | 0.2 |
| Tinuvin 326 | 0.3 | 0.3 | 0.3 | 0.3 |
| Bromine content, % calculated | 10 | 10 | 10 | 10 |
| Antimony trioxide, % calculated | 4 | 4 | 4 | 4 |
| Properties | | | | |
| Flammability test: UL-94 vertical burning test at 1.6 mm thickness | V-0 | V-0 | V-0 | V-0 |
| Mechanical properties: | | | | |
| Impact strength (Izod notched J/m) | 45.4 | 35 | 40 | 46 |
| Elongation at break (%) | 3 | 20 | 19.8 | 30.2 |
| HDT (° C.) | 72 | 72 | 74 | 75 |

Examples 5-8

HIPS formulations, in which F-3014 and F-2400 were combined together in various weight ratios, were prepared according to the general procedure set out above. The compositions of the HIPS formulations and their properties are tabulated in Table 7.

TABLE 7

| Example | 5 | 6 | 7 | 8 |
|---|---|---|---|---|
| F-2400:F-3014 weight ratio | 20:80 | 35:65 | 50:50 | 65:35 |
| Composition (% by weight): | | | | |
| HIPS Styron 1200 | 77.3 | 77 | 76.7 | 76.4 |
| F-3014 | 13.7 | 11.3 | 8.85 | 6.3 |
| F-2400 | 3.4 | 6.1 | 8.85 | 11.7 |
| AO 112 | 5 | 5 | 5 | 5 |
| PTFE | 0.1 | 0.1 | 0.1 | 0.1 |
| Irganox B-225 | 0.2 | 0.2 | 0.2 | 0.2 |
| Tinuvin 326 | 0.3 | 0.3 | 0.3 | 0.3 |
| Bromine content, % calculated | 10 | 10 | 10 | 10 |
| Antimony trioxide, % calculated | 4 | 4 | 4 | 4 |
| Properties | | | | |
| Flammability test: UL-94 vertical burning test at 1.6 mm thickness | V-0 | V-0 | V-0 | V-0 |
| Mechanical properties: | | | | |
| Impact strength (Izod notched J/m) | 64.7 | 47 | 56 | 63 |
| Elongation at break (%) | 23 | 25.67 | 31.21 | 35.2 |
| HDT (° C.) | 69.0 | 71 | 73 | 73 |

Examples 9-12

HIPS formulations, in which F-3020 and F-2400 were combined together in various weight ratios, were prepared according to the general procedure set out above. The compositions of the HIPS formulations and their properties are tabulated in Table 8.

TABLE 8

| Example | 9 | 10 | 11 | 12 |
|---|---|---|---|---|
| F-2400:F-3020 weight ratio | 20:80 | 35:65 | 50:50 | 65:35 |
| Composition (by weight %): | | | | |
| HIPS Styron 1200 | 76.4 | 76.2 | 76.1 | 75.9 |
| F-3020 | 14.4 | 11.8 | 9.15 | 6.5 |
| F-2400 | 3.6 | 6.4 | 9.15 | 12.0 |
| AO 112 | 5 | 5 | 5 | 5 |
| PTFE | 0.1 | 0.1 | 0.1 | 0.1 |
| Irganox B-225 | 0.2 | 0.2 | 0.2 | 0.2 |
| Tinuvin 326 | 0.3 | 0.3 | 0.3 | 0.3 |
| Bromine content, % calculated | 10 | 10 | 10 | 10 |
| Antimony trioxide, % calculated | 4 | 4 | 4 | 4 |
| Properties | | | | |
| Flammability test: UL-94 vertical burning test at 1.6 mm thickness | V-0 | V-0 | V-0 | V-0 |
| Mechanical properties: | | | | |
| Impact strength (Izod notched J/m) | 58.1 | 34 | 40 | 52 |
| Elongation at break (%) | 23 | 22 | 31.4 | 30.6 |
| HDT (° C.) | 69.0 | 73 | 74 | 74 |

Examples 13-16

HIPS formulations, in which F-3100 and F-2400 were combined together in various weight ratios, were prepared according to the general procedure set out above. The compositions of the HIPS formulations and their properties are tabulated in Table 9.

TABLE 9

| Example | 13 | 14 | 15 | 16 |
|---|---|---|---|---|
| F-2400:F-3100 weight ratio | 20:80 | 35:65 | 50:50 | 65:35 |
| Composition (by weight %): | | | | |
| HIPS Styron 1200 | 76.4 | 75.5 | 75.5 | 75.5 |
| F-3100 | 14.4 | 12.3 | 9.45 | 6.6 |
| F-2400 | 3.6 | 6.6 | 9.45 | 12.3 |
| AO 112 | 5 | 5 | 5 | 5 |
| PTFE | 0.1 | 0.1 | 0.1 | 0.1 |
| Irganox B-225 | 0.2 | 0.2 | 0.2 | 0.2 |
| Tinuvin 326 | 0.3 | 0.3 | 0.3 | 0.3 |
| Bromine content, % calculated | 10 | 10 | 10 | 10 |
| Antimony trioxide, % calculated | 4 | 4 | 4 | 4 |
| Properties | | | | |
| Flammability test: UL-94 vertical burning test at 1.6 mm thickness | V-0 | V-0 | V-0 | V-0 |
| Mechanical properties: | | | | |
| Impact strength (Izod notched J/m) | 30.5 | 31 | 48 | 63 |
| Elongation at break (%) | 22 | 26 | 27.8 | 32.3 |
| HDT (° C.) | 75 | 76 | 75 | 75 |

Examples 17-20

HIPS formulations, in which F-2100 and F-2400 were combined together in various weight ratios, were prepared according to the general procedure set out above. The compositions of the HIPS formulations and their properties are tabulated in Table 10.

TABLE 10

| Example | 17 | 18 | 19 | 20 |
|---|---|---|---|---|
| F-2400:F-2100 weight ratio | 20:80 | 35:65 | 50:50 | 65:35 |
| Composition (by weight %): | | | | |
| HIPS Styron 1200 | 76.4 | 75.5 | 75.5 | 75.5 |
| F-2100 | 14.4 | 12.3 | 9.45 | 6.6 |
| F-2400 | 3.6 | 6.6 | 9.45 | 12.3 |
| AO 112 | 5 | 5 | 5 | 5 |
| PTFE | 0.1 | 0.1 | 0.1 | 0.1 |
| Irganox B-225 | 0.2 | 0.2 | 0.2 | 0.2 |
| Tinuvin 326 | 0.3 | 0.3 | 0.3 | 0.3 |
| Bromine content, % calculated | 10 | 10 | 10 | 10 |
| Antimony trioxide, % calculated | 4 | 4 | 4 | 4 |
| Properties | | | | |
| Flammability test: UL-94 vertical burning test at 1.6 mm thickness | V-0 | V-0 | V-0 | V-0 |
| Mechanical properties: | | | | |
| Impact strength (Izod notched J/m) | 32.4 | 50 | 55 | 66 |
| Elongation at break (%) | 29 | 30.5 | 37.34 | 31.42 |
| HDT (° C.) | 74 | 75 | 75 | 75 |

Example 21

Preparation of FR Master Batch Compositions

F-2400, F-2001 (in 80:20 weight ratio) and 0.1% Irganox 225 were compounded in Berstroff 25 mm double screw extruder to form pellets. The compounding process was carried out in two different ways:

1) premixing and shaking the ingredients in a plastic bag, and feeding the mixture into the extruder; and 2) separately feeding F-2400 pellets and F-2001 powder into the extruder (using two feeders from K-trop).

The compounding process proceeds without difficulties using either of the feeding methods. The strands produced were conveniently pelletized using Pelletizer from Acropac, giving nice, fairly spherical, dust free pellets with about 3 mm average diameter. The pellets can be used as masterbatch for the preparation of the HIPS compositions of the invention.

Examples 22 and 23

Preparation and Application of Dust-Free Flame Retardant Concentrates

F-2400, F-2001 (in 80:20 weight ratio) were compounded in Berstorff 25 mm double screw extruder to form pellets. The compositions of the two masterbatches are presented in Table 11:

TABLE 11

| Example Material | unit | 22 Masterbatch 1 | 23 Masterbatch 2 |
|---|---|---|---|
| F-2400 | % | 79.52 | 77.12 |
| F-2001 | % | 19.88 | 19.28 |
| EMA | % | | 3 |
| PTFE | % | 0.5 | 0.5 |
| Irganox 225 | % | 0.1 | 0.1 |

The compounding process was carried out as follows. F-2400 granules were mixed with Irganox 225 and were fed via gravimetric feeder No. 1 of the main feeding port of the extruder. The PTFE was fed via gravimetric feeder No. 2 of the main feeding port of the extruder (the EMA pellets in the case of Example 23 were also fed through feeder no. 2). F-2001 powder was fed via gravimetric feeder No. 3 of the downstream feeding port of the extruder (using feeders from K-trop).

The compounding process was accomplished easily in both examples under the conditions summarized in Table 12.

TABLE 12

| PARAMETER | UNITS | Set values |
|---|---|---|
| Feeding zone temperature ($T_1$) | ° C. | no heating |
| $T_2$ | ° C. | 20 |
| $T_3$ | ° C. | 20 |
| $T_4$ | ° C. | 180 |
| $T_5$ | ° C. | 180 |
| $T_6$ | ° C. | 180 |
| $T_7$ | ° C. | 180 |
| $T_8$ | ° C. | 180 |
| $T_9$ | ° C. | 190 |
| Temperature of melt | ° C. | |
| Screw speed | RPM | 350 |
| Feeding rate | Kg/h | 17 |

The strands produced were conveniently pelletized using Pelletizer from Acropac, giving nice, spherical, dust free pellets with about 2 to 6 mm average diameter.

Examples 24 and 25

The pellets according to Examples 22 and 23 were used to prepare HIPS compositions via the masterbatch route, as illustrated in Examples 24 and 25, respectively. The compounding and injection molding were carried out according to the general procedure described above. It should be rioted that during the compounding steps, no dust was generated in the feeding zone of the extruder and the dosing of the FR masterbatches was easy. The compositions of the HIPS formulations obtained and their properties are summarized in Table 13.

TABLE 13

| Composition (by weight %): | Units | Example 24 FR = Masterbatch 1 | Example 25 FR = Masterbatch 2 |
|---|---|---|---|
| HIPS Styron 1200 | % | 75.3 | 74.7 |
| FR | % | 19.4 | 20.0 |
| AO 112 | % | 5 | 5 |
| Tinuvin 326 ex Ciba | % | 0.3 | 0.3 |
| Br calculated | % | 10 | 10 |

TABLE 13-continued

| Composition (by weight %): | Units | Example 24 FR = Masterbatch 1 | Example 25 FR = Masterbatch 2 |
|---|---|---|---|
| AO calculated | % | 4 | 4 |
| PTFE calculated | % | 0.1 | 0.1 |
| UL-94V (1.6 mm) | | | |
| Max flaming time | sec | 1 | 1 |
| Total flaming time | sec | 6 | 10 |
| Rating | | V-0 | V-0 |
| MVI at 200° C./5 kg | cm 3/10 min | 6 | 9 |
| MFI at 200° C./5 kg | g/10 min | 7 | 10 |
| Izod notched impact | J/m | 70.3 | 83.9 |
| HDT as molded | ° C. | 75.3 | 75.4 |
| Tensile strength | N/mm² | 28 | 25 |
| elongation at yield | % | 1.7 | 1.55 |
| elongation at break | % | 30 | 51.74 |
| Tensile modulus | N/mm² | 2036 | 1961 |

The use of the dust-free, free-flowing granules of the masterbatches of Example 22, and especially of Example 23, facilitates the operations of dosing, mixing, compounding and other usual downstream operations of the plastic industry, allowing an easy preparation of the HIPS compositions identified in Table 13. When the flame retardants are added to the HIPS via Masterbatch 1, high level of fire retardancy [UL 94 V-0 rating (1.6 mm)] is achieved, combined with high impact properties. When the flame retardants are added to the HIPS via Masterbatch 2, which is a modified version of Masterbatch 1 in which EMA, a processing aid additive (viscosity enhancer) is present, high level of flame retardancy [UL 94 V-0 (1.6 mm)] is attained, combined with improved melt flow and a further improvement of impact properties.

Examples 26 (of the Invention) and 27 (Comparative)

Example 26 illustrates HIPS composition prepared via the masterbatch route, using Masterbatch 2 of Example 23 as the flame retardant. In comparative Example 27, decabromodiphenyl ethane (S-8010 in a powder form available from Albemarle Corporation), a flame retardant recommended for applications in HIPS, has been used as the flame retardant in the HIPS formulation. The compositions were prepared according to the compounding and injections molding procedures described above.

The compositions and properties of the HIPS formulations are summarized in Table 14. The compositions were also tested for their UV stability. To this end, molded samples of 3.2 thickness were exposed to UV light for a period of time of 150 hours using a QUV 340B lamp of an UV 2000 instrument manufactured by Atlas. The samples were then tested for their color deviation (DE) using a spectrophotometer (Datacolor SF-600). The DE values are also reported in Table 14.

TABLE 14

| Composition (by weight %): | Units | Example 26 Masterbatch 2: 77.12% F-2400 19.28% F-2001 3.0% EMA 0.5% PTFE 0.1% Irganox | Example 27 S-8010 |
|---|---|---|---|
| HIPS Styron 1200 | % | 75.45 | 79.0 |
| FR Load | % | 17.8 | 13.4 |
| AO112 | % | 3.75 | 4.6 |
| Irganox B-225 | % | 0.2 | 0.2 |
| Tinuvin 326 ex Ciba | % | 0.3 | 0.3 |
| TiO₂ | % | 2.5 | 2.5 |
| Bromine (calculated) | % | 9 | 11 |
| Sb₂O₃ (calculated) | % | 3.0 | 3.7 |
| UL 94V at 1.6 mm | | V-0 | V-0 |
| Izod notched impact | J/m | 55.7 | 45.6 |
| MVI (melt volume index) | cm3/10 min | 8.28 | 6.16 |
| MFI (melt flow index) | g/10 min | 8.75 | 6.55 |
| HDT (unannealed/annealed) | ° C. | 75.8/89.9 | 74.9/90.1 |
| Color change after 150 h 340 QUV | DE | 8.5 | 25.84 |

Regarding the HIPS composition of Example 26, it is noted that high level of fire retardancy [UL 94 V-0 rating (1.6 mm)] is achieved in the presence of relatively low bromine content (9%, compared to 11% bromine that need to be present when the flame retardant is the comparative decabromodiphenyl ethane of Example 27). The difference between the bromine content of the two compositions is especially notable in view of the fact that the amount of the antimony trioxide used as a synergist for supporting the action of the brominated flame retardant, is even lower in Example 26 (only 3.0% of antimony trioxide, compared with 3.7% present in the Example 27).

The composition of Example 26 demonstrates very good UV stability, indicated by a color change of 8.5 following the exposure to UV light, while the composition of Example 27 suffers a greater color change.

Preparation 1

Preparing a Flame Retarding Agent of Formula 1(b)

To a 1-liter glass kettle equipped with stirrer, electric heating mantle, a thermometer and a reflux condenser were added 100 grams of brominated epoxy resin (commercially available as F-2001) having the following characteristics: EEW of 398 grams per mole and bromine content of 49% (w/w), 300 grams methyl isobutyl ketone and 155 grams of tribromophenol. The mixture was stirred until all solids dissolve and then 0.75 grams of tributyl amine was added. The reaction mixture was heated slowly to reflux and the reaction continued for 6 hours.

After cooling to room temperature, the reaction mixture was washed 3 times with distilled water followed by phase separation of the aqueous phase. Finally the methyl isobutyl ketone was distilled off at 160° under vacuum. 250 grams of the resin according to Formula (1b) were obtained having the following properties:
Softening point: 101° C.
Average molecular weight (as determined by GPC): 1460
Bromine content: 59 wt %.

The procedure described above may be modified in order to obtain different resins of Formula (1b), namely, mixtures comprising the monomer (1b-I), the dimer of Formula (1b-II), the trimer of Formula (1b-III) and higher oligomers in different proportions, by changing the weight ratio of the reactants (e.g., reacting 574 g of YDB 400 or F-2001, 294.6 g of tribromophenol and 127 g of tetrabromobisphenol A).

The invention claimed is:

1. A flame-retarded polymeric composition comprising high impact polystyrene (HIPS) and a combination of flame retardants of Formula (1):

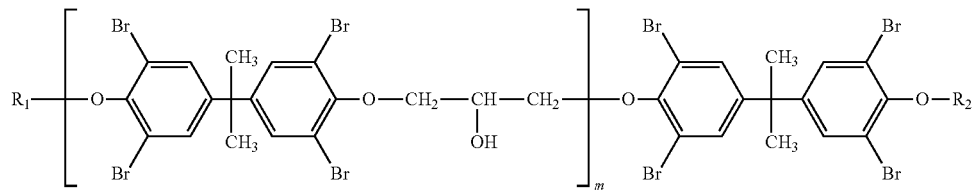

wherein m indicates the degree of polymerization and $R_1$ and $R_2$ are independently selected from the group consisting of

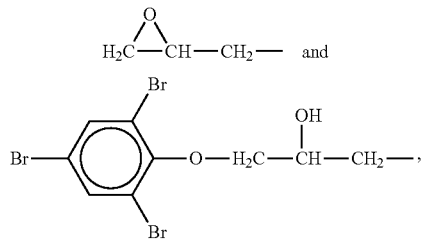

wherein said combination of flame retardants of Formula (1) comprises:

(i) at least one high molecular weight brominated epoxy polymer (HMW-BE) of Formula (1a):

wherein m, the average degree of polymerization, is between 49 and 135, and said at least one HMW-BE having a weight-average molecular weight between 40,000 and 60,000, or an end-capped derivative thereof; and (ii) at least one low molecular weight brominated epoxy oligomer (LMW-BE) with number-average molecular weight between 670 and 2500, or at least one intermediate molecular weight brominated epoxy polymer (IMW-BE) with weight-average molecular weight between 5000 and 30000; or an end-capped derivative thereof;

and wherein the HMW-BE is the predominant component in said combination of flame retardants.

2. A flame-retarded HIPS composition according to claim 1, wherein the combination of flame retardants comprises LMW-BE, with the weight ratio between the HMW-BE and LMW-BE components being from 3:2 to 5:1.

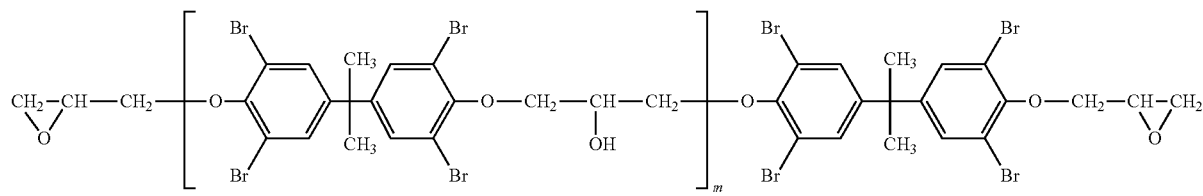

3. A flame-retarded HIPS composition according to claim 2, wherein the LMW-BE flame retardant is of Formula (1a):

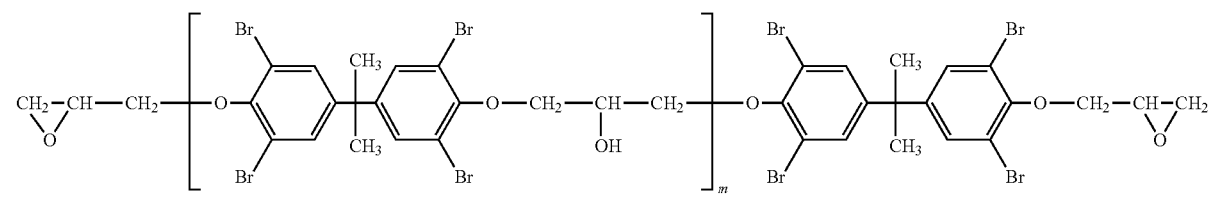

wherein m, the average degree of polymerization, is between 0.1 and 3.15.

4. A flame-retarded HIPS composition according to claim 3, wherein the LMW-BE flame retardant has number-average molecular weight of about 800 to 1300.

5. A flame-retarded HIPS composition according to claim 2, wherein the LMW-BE flame retardant is of Formula (1b):

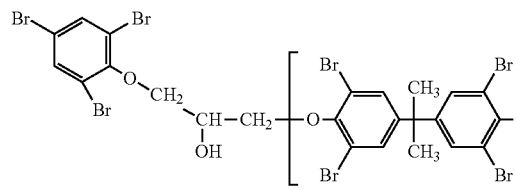
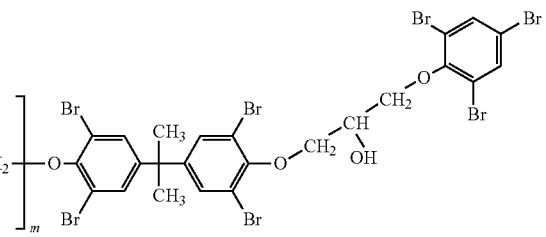

wherein m, the average degree of polymerization, is between 0.1 and 3.

6. A flame-retarded HIPS composition according to claim 5, wherein the LMW-BE flame retardant has number-average molecular weight of about 1400 to 2500.

7. A flame-retarded HIPS composition according to claim 1, wherein the combination of flame retardants comprises IMW-BE flame retardant represented by the following Formula (1a):

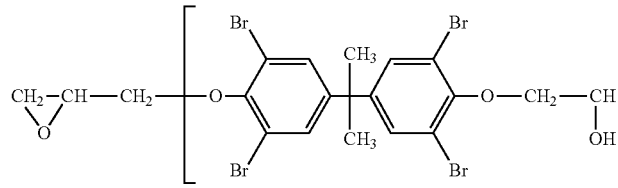

wherein m, the average degree of polymerization, is between 6 and 49.

8. A flame-retarded HIPS composition according to claim 1, wherein the bromine content of the composition is between 9 and 11% by weight, and wherein the composition further comprises antimony trioxide at a concentration between 2 and 3% by weight.

9. A process for preparing the high impact polystyrene composition of claim 1, comprising:

providing a masterbatch which consists essentially of brominated flame-retardants, said masterbatch comprising
(i) at least one high molecular weight brominated epoxy (HMW-BE) polymer of Formula (1a) with weight-average molecular weight of about 40,000 to 60,000 and (ii) at least one low molecular weight brominated epoxy (LMW-BE) oligomer of Formula (1a) with number-average molecular weight between 670 and 2500, wherein the total concentration of said HMW-BE and LMW-BE is not less than 91% based on the weight of the masterbatch composition, and compounding said masterbatch with high impact polystyrene in an extruder.

10. A process according to claim 9, wherein the masterbatch further comprises an anti-dripping agent and a processing modifier.

11. A method for increasing the impact resistance measured as IZOD impact strength of articles made from flame-retarded HIPS composition in which LMW-BE, IMW-BE or a mixture thereof as defined in claim 1 is present, comprising adding HMW-BE of Formula (1a) as defined in claim 1 to the HIPS composition.

12. A masterbatch composition which consists essentially of a combination of brominated flame retardants, said combination comprising:
(i) high molecular weight brominated epoxy polymer (HMW-BE) of Formula (1a):

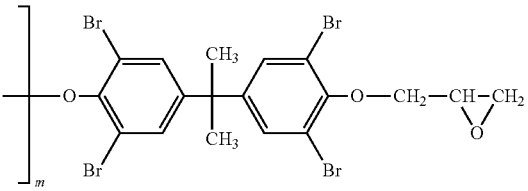
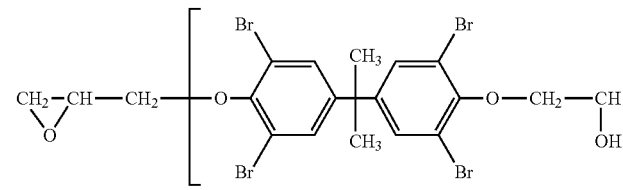

having weight-average molecular weight of about 40000 to 60000; and
(ii) low molecular weight brominated epoxy oligomer (LMW-BE) of Formula (1a):

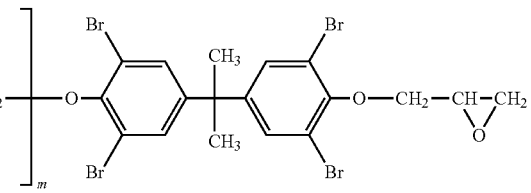

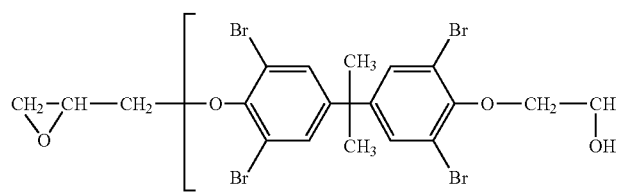 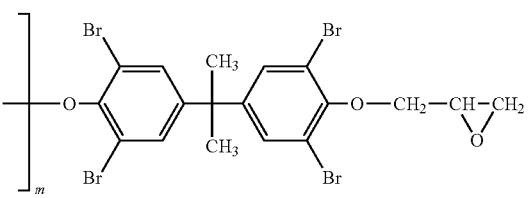

having number-average molecular weight of about 800 to 1300, wherein the total concentration of said HMW-BE and LMW-BE is not less than 91% relative to the weight of the masterbatch wherein said masterbatch further comprises an anti-dripping agent and a processing modifier.

13. A masterbatch composition according to claim 12, wherein the total concentration of the HMW-BE and LMW-BE is not less than 93% relative to the weight of the masterbatch.

14. A masterbatch composition according claim 12, wherein the weight ratio between the HMW-BE and LMW-BE components is from 3:2 to 5:1.

15. A masterbatch composition according to claim 12, wherein the anti-dripping agent is polytetrafluoroethylene and the processing modifier is ethylene methyl acrylate copolymer.

16. A masterbatch composition according to claim 12, comprising from 75 to 80% HMW-BE with weight-average molecular weight of 40,000 to 60,000, from 15 to 25% LMW-BE with number-average molecular weight of between 800 and 1300, from 0.1 to 5% polytetrafluoroethylene and from 1 to 5% ethylene methyl acrylate copolymer based on the total weight of the masterbatch composition.

\* \* \* \* \*